United States Patent [19]

Mizuno et al.

[11] 4,024,635

[45] May 24, 1977

[54] MOWING APPARATUS

[75] Inventors: Hitoshi Mizuno; Satoshi Akiyama, both of Odawara, Japan

[73] Assignee: Kabushiki Kaisha Shikutani, Odawara, Japan

[22] Filed: Jan. 21, 1976

[21] Appl. No.: 651,192

[30] Foreign Application Priority Data

July 4, 1975 Japan .............................. 50-82550

[52] U.S. Cl. .................................. 30/276; 56/12.7
[51] Int. Cl.² ......................................... A01D 55/18
[58] Field of Search ............. 56/12.7, 295; 30/276, 30/347; 242/167, 172, 173

[56] References Cited

UNITED STATES PATENTS

| 1,516,002 | 11/1924 | Curry ................................. 242/173 |
| 2,639,097 | 5/1953 | Scott, Jr. ........................... 242/173 |
| 2,674,215 | 4/1954 | Thompson, Jr. et al. ..... 242/173 X |
| 2,883,746 | 4/1959 | Gilsi ................................. 30/276 X |
| 3,859,776 | 1/1975 | Ballas et al. ........................ 56/12.7 |

FOREIGN PATENTS OR APPLICATIONS 1,281,450  12/1961  France ............................... 56/12.7

Primary Examiner—J.N. Eskovitz
Attorney, Agent, or Firm—Birch, Stewart, Kolasch and Birch

[57] ABSTRACT

A mowing apparatus of the type having a rotatable disk-like casing containing one or more rolls of flatly and concentrically coiled string made of a high polymer synthetic material. Each coil of the string is interconnected at at least one point to the adjacent coil by the help of a fixing element so that it can be laterally payed out without the disjoining of the coil. The free end extends through the respective guide ports, outwardly from the casing in order to form a cutting flail with an effective working length.

3 Claims, 10 Drawing Figures

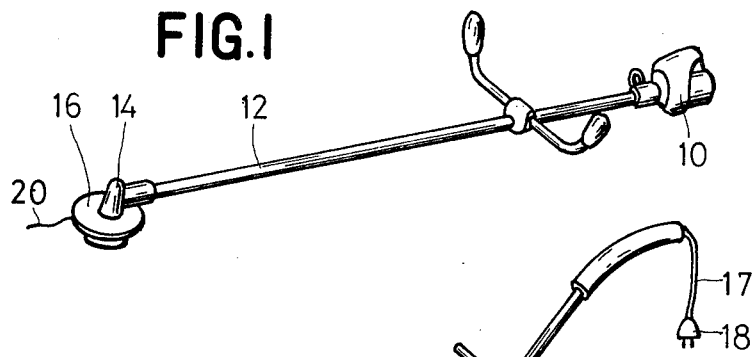
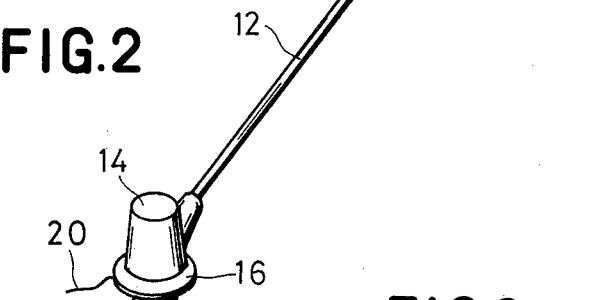
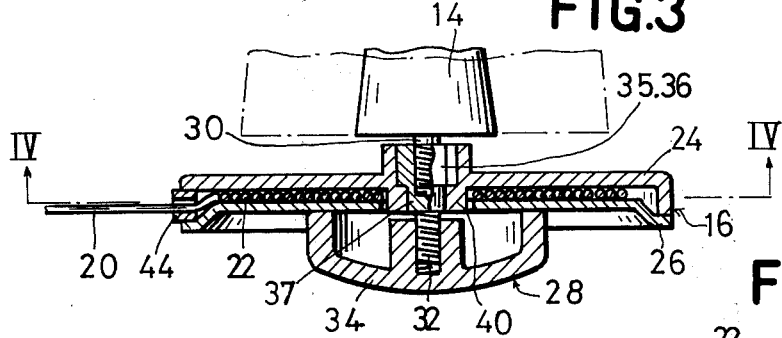
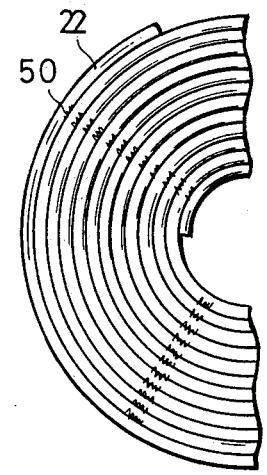
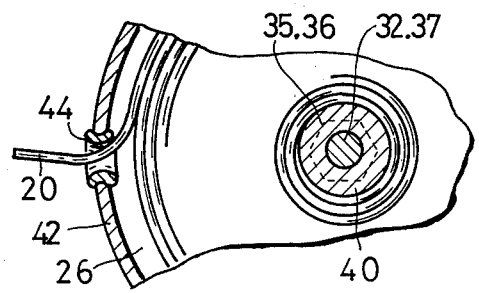

MOWING APPARATUS

BACKGROUND AND SUMMARY OF THE INVENTION

The present invention relates to mowing machines of the type having a cutting assembly rotatable in a cutting plane and more particularly to a rotary disk-like casing containing therein at least one flatly coiled cutting line made of a high polymer synthetic material.

The field of technology to which the present invention is directed is mowing apparatus of a type wherein a rotary assembly is provided with at least one nonmetallic flexible line wound about a spool, the effective working length of the line being adapted to be lengthened at desired times while it is in a non-working condition, as the working length becomes shortened during use. Nylon monofilament strings which are almost completely incapable of causing any significant injury to persons or animals struck by the flailing cutting string are effective for use as safe, rotary cutting means. These strings are particularly suitable for cutting or trimming along fences, walls and the trunks or stems of trees.

There is illustrated and described in U.S. Pat. Nos. 3,708,967; 3,826,068; and 3,859,776 one or more embodiments of a mowing device having a rotary head member arranged to be rotated by a gasoline-powered engine or electric motor together with one or more spools which is housed in lockable relation to the rotary head member. A length of flexible nonmetallic line is coiled about the spool and its free end extends peripherally from the spool and the head. The free end swings arcuately about upon the actuation of the engine or motor to cut adjacent vegetation in the manner of a flail. The line storage means in the form of spools is locked from rotation but is releasable so that additional line may be payed out as the effective working length of the line becomes shortened during use.

However, the aforementioned device is subject to certain disadvantages due to having the storage means in the form of spools. One of the disadvantages is that the rotary head must be high so as to accommodate the vertical length of the spool. Also, the rotary head is complicated in order to provide a means for locking and releasing the spool. Another inconvenience is that the outermost layer is likely to become slack with the result that the free end will unwind more than is necessary to produce an effective working length to be payed out. This results in the troublesome job of rearranging the line and the spool. This problem occurs when the spool is stored, when an additional length is drawn, and when the device starts or stops to rotate. Accordingly, there is a demand for improved mowing apparatus which is free from the aforementioned disadvantages.

Therefore, it is an object of the present invention to provide an improved mowing apparatus having storage means in the form of a hollow disk which contains at least one flatly coiled and radially interconnected cutting string made of a high polymer synthetic material, whereby the effective working length of the string may be lengthened at desired times as the working length becomes shortened during use.

Another object of the present invention is to provide an improved mowing apparatus which is simple and compact in construction and less troublesome in use.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

For attaining the above objects, the apparatus according to the present invention includes an output axis rotatably mounted at one end of a supporting means and connected to an electric motor or a transmission driven by a gasoline-powered engine or the like. A rotary disk-like casing is detachably secured to the output axis for rotation therewith in a cutting plane. The casing consists of upper and lower disk portions coaxially disposed on the output axis and housing therebetween a supply of cutting string wound in the form of a hollow disk. A fastening portion is detachably fixed to the output axis for tightly fastening the upper and lower disk portions together about the cutting string. The upper disk portion is provided at its circumference with a depending circular wall, the inner diameter of which is arranged to be larger than the outer diameter of the supply of the cutting string. The supply of string is flatly coiled and each coil is radially interlinked with an adjacent core in a manner that the free end can unwind without disjoining of the coiled supply. The string extends outwardly through a guide port provided in the wall of the casing to form a cutting flail having an effective working length. The string is made of a high polymer synthetic material which is flexible and yielding to the extent that it is substantially incapable of causing damage or injury when impacting against persons or animals.

In one embodiment of the present invention, a single supply of cutting string in the form of a hollow disk is provided in a rotary casing in coaxial alignment with an output axis. Alternatively, two coiled cutting strings may be supplied in a rotary casing to provide two cutting flails extending from opposite sides of the periphery of the casing.

The apparatus of the present invention contains neither spools for winding the cutting string thereon nor devices for locking and releasing the spools, and therefore is simple and compact in construction. In one embodiment, the adjacent coils of the coiled supply of the cutting string is radially and partially interconnected by the use of various fastening means such as ultrasonic bonding, adhesive agents, film sheet backing, and injection molding so as to prevent the case from loosening, except for the case in which an additional length is pulled out.

BRIEF DESCRIPTION OF THE DRAWINGS

The present invention will become more fully understood from the detailed description given hereinbelow and the accompanying drawings which are given by way of illustration only, and thus are not limitative of the present invention, and wherein, FIGS. 1 and 2 are pictorial representations of the portable mowing apparatus of the present invention showing a gasoline-powered engine and an electric motor, respectively;

FIG. 3 is a side view, partly in central section, of a portion of the apparatus shown in FIGS. 1 and 2, wherein a cutting string is flatly coiled and supplied in the form of a hollow disk;

FIG. 4 is a sectional view taken along line IV—IV of FIG. 3;

FIG. 5 is a schematic plan view of a string which is flatly coiled and radially interlinked by the use of ultrasonic bonders;

DETAILED DESCRIPTION OF THE PREFERRED EMBODIMENTS

Figure 6:
FIGS. 6 through 8 are schematic side views of different modifications of flatly coiled string which are radially partially interconnected by the use of adhesive agents, backings and injection molding, respectively.

Referring to FIG. 1, the portable-type mower of the present invention includes a power means in the form of a gasoline-powered engine 10 disposed on the rearward end of a tubular shaft 12, a transmission (not shown) within the head housing 14 on the forward end, and a rotary disk-like casing 16 detachably connected to the transmission within the head housing. The rotational movement of engine 10 is transmitted to casing 16 via rotary drive axis inside the tubular shaft 12 and the transmission. The free end or cutting flail 20 extends laterally from casing 16.

Referring now to FIG. 2, there is shown another mower similar to FIG. 1 but containing an electric motor (not shown) within a head housing 14. An electric cable 17 is located in a tubular shaft 12 and is connected at its lower end to the motor. At the opposite end, a plug 18 is provided for connection with a suitable source of electric power. A rotary disk-like casing 16 is directly connected with the motor. Other elements are the same as shown in FIG. 1.

Referring now to FIGS. 3 and 4, there is shown, partially in section, a rotary disk-like casing 16, consisting of upper and lower disk members 24 and 26 and a fixing member 28 arranged for threading engagement with the screw portion of the output axis 30 of the transmission or electric motor which is contained within head housing 14 as shown in FIGS. 1 and 2 (the former by solid lines and the latter by broken lines). A cutting string 22 made of a high polymer synthetic material, such as nylon filament, is flatly coiled in the form of a hollow disk and concentrally sandwiched in between upper and lower disk members 24 and 26. Fixing member 28 includes a bolt member 32 and a nut element 34, the bolt element having a head portion 36 of a polygonal, preferably hexagonal, cross-section and a lower portion arranged for threading engagement with nut element 34. Polygonal or hexagonal head portion 36 is arranged to be closely fitted in the polygonal or hexagonal recess 35 formed in the center of upper disk member 24. As is best seen in FIG. 4, upper disk member 24 has a center bore 37 through which extends the lower portion of bolt element 32. A hub portion 40 of the disk member 24 has an outer diameter which is slightly smaller than any of the inner diameters of lower disk member 26 and the coil of cutting string 22. A peripheral depending wall 42 has an inner diameter which is larger than the outer diameter of the coil. Thus, the coiled cutting string 22 is disposed between hub portion 40 and peripheral depending wall 42. The depending wall 42 of the upper disk member 24 is provided with one or more equidistantly disposed guide ports 44, through which the uncoiled end of the coiled cutting string 22 outwardly extends to form a cutting flail 20 with an effective working length. Upper and lower disk members 24 and 26 define a distance therebetween which is smaller than the thickness of the cutting string 22. Nut element 34 is cap-shaped and has its circumference formed in a manner so that the lower disk member 26 as well as the coiled cutting string 22 may be fixed against upper disk member 24 and locked from rotation as the nut element is tightened.

As illustrated in FIG. 5, a cutting string 22 of high polymer synthetic material is flatly wound in the form of a hollow disk and has its radial crossed portions 50 heat-bonded by the use of heaters or ultrasonic bonders, so that the free end may be periodically pulled out without unravelling the coil.

Figure 7:
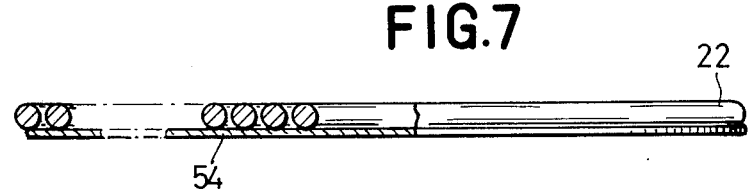
Figure 8:

Referring now to FIGS. 6 to 8, there is shown various modifications of cutting string 22 in the form of a hollow disk, each coil thereof being at least partially interlinked with adjacent coils along a radial line so as to permit the free end to be payed out without disjoining the flat coil. An adhesive agent 52 is used in the embodiment of FIG. 6 for the radial, partial adhesion of each circle of flatly coiled string 22. The coiled string 22 of FIG. 7 is backed with a circular film sheet 54. The string 22 of FIG. 8 is produced from a high polymer resin by the process of single-shot injection molding and has its circles integrally joined side by side with filmy intermediates 56.

It may be clearly seen in FIGS. 3 and 4 that, as a result of eliminating spools, the apparatus is very simple and compact in construction and needs no provision for locking and releasing spools. When the rotary casing 16 is in a static condition, the cutting flail 20 will limply dangle as is seen in FIGS. 1 and 2. When the rotary casing is rotated at normal operating velocities, the cutting flail will tend to extend rigidly, outwardly but also yieldingly from the periphery of the rotary casing, as illustrated in FIGS. 3 and 4. The coil of cutting string 22 may be stored between upper and lower disk members 24 and 26 without any problem because it is combined so as to prevent even the outermost circle from loosening.

In operation, upon acutation of the gasoline-powered engine 10 or the electric motor within the head housing 14, the rotary disk-like casing 16 is rotated at a desired rotational speed, whereby the cutting flail 20 extends radially, outwardly in a rigid manner from casing 16 within its cutting plane, and whereby mowing or the like may be accomplished safely and efficiently. It should be understood that the apparatus of the present invention is very easy in operation due to its thin, compact rotary casing.

Each coil of cutting string 22 of FIGS. 5 to 8 is similarly arranged to permit its outermost circle to be stripped and payed out from the coil from where it extends outwardly from the rotary casing 16 through guide port 44, when nut element 34 is loosened and the free end or cutting flail 20 is pulled. As flail 20 begins to wear away and become shortened through use, its length can be restored to its original proper cutting length by terminating rotation of rotary casing 16 and by unwinding string 22 to the extent desired.

It will be apparent that in the apparatus of the embodiments described above, neither loosening nor disjoining of the coil of cutting string 22 will occur even when shocks are translated to the coil due to the starting or stoppage of the rotary casing or when the free end is suddenly pulled.

Figure 9:
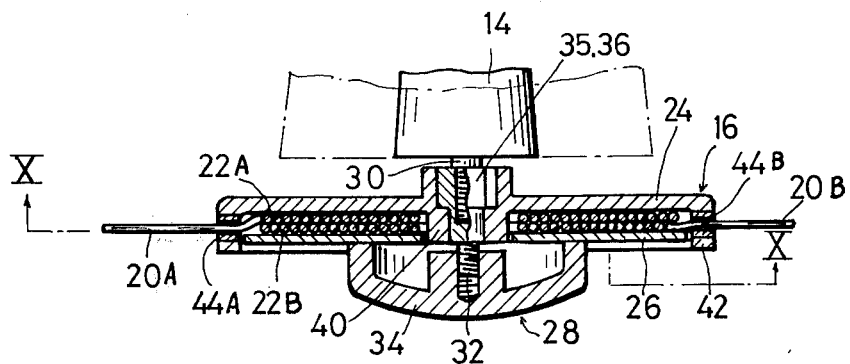
FIG. 9 is a view similar to FIG. 3 but showing another embodiment of the present invention wherein a pair of two coiled strings are stored in the apparatus.
Figure 10:
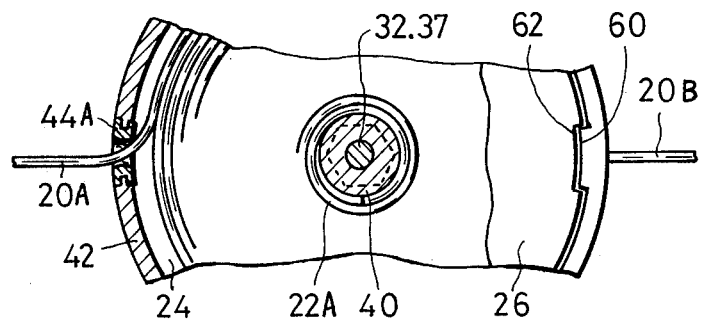
FIG. 10 is a sectional view taken along the line X—X of FIG. 9.

It may be clearly seen in FIGS. 9 and 10 that there are two separate cutting flails 20A and 20B extending in opposite directions from rotary disk-like casing 16, through their respective guide ports 44. In this embodiment, the cutting strings 22A and 22B are separately wound, in the same direction, in the form of two concentrically folded hollow disks, and may be any of the different modifications of FIGS. 5 to 8. As illustrated in FIG. 10, upper disk member 24 has at its outer periphery a circular depending wall 42 formed with a pair of small inward projections 60 in which a couple of guide ports 44A and 44B are inserted. On the other hand, lower disk member 26 is formed with a pair of recesses 62 arranged for fitting engagement with projections 60, and has the outer diameter slightly smaller than the inner diameter of circular depending wall 42 of upper disk member 24, so as to be contained within the upper disk member and locked from rotation relative thereto. Two coiled strings 22A and 22B are fixedly sandwiched between upper and lower disk members 24 and 26 upon the fastening of fixing member 28 or the threading of the nut element 34 onto the bolt element 32.

It will be readily understood that the apparatus of FIGS. 9 and 10 may accomplish mowing or the like more efficiently with its two cutting flails 20A and 20B. The apparatus is similarly simple in construction and less troublesome in use, as compared with the known mowers. Each of the cutting strings may be easily supplied or pulled out as the cutting flail becomes shortened in the same way as in the embodiment described above. The coils of cutting strings 22A and 22B, including the outermost circle thereof, will never loosen at any time once the fixing member 28 is fastened. Therefore, the cutting flail will never unwind in the rotary casing during use.

It will be understood that three or more coiled cutting strings can be concentrically stored in any of the rotary disk-like casings described above, as long as three or more respective guide posts are equidistantly provided in the circular depending wall of the upper disk member.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mowing apparatus comprising, in combination, an output axis and rotary power means mounted on supporting means, said output axis being rotatably connected with said rotary power means, a rotary disk-like casing detachably and coaxially secured to said output axis for rotation therewith in a cutting plane, said rotary disk-like casing including upper and lower disk members, said upper and lower disk members defining a chamber therebetween, at least one guide port provided at the periphey of the disk-like casing, said upper disk member having a circular depending wall at its periphery, said circular depending wall being formed with a small inward projection in each position where said guide port is provided, said lower disk member having an outer diameter smaller than the inner diameter of said circular depending wall and provided with inward recesses adapted for fitting engagement with each of said inward projections provided in said circular depending wall, whereby said lower disk member together with the coil of said string is contained within the hollow cylindrical inside of said upper disk member and locked for rotation therewith, at least one flatly coiled cutting string made of a high polymer synthetic material disposed in said chamber, a fixing member detachably secured to said output axis for fixing said coiled cutting string between said upper and lower disk member, said fixing member consisting of a bolt element detachably secured to said output axis and a nut element adapted for threading engagement with said bolt element, said bolt element having an upper enlarged polygonal head adapted for fitting engagement with a center polygonal recess provided in said upper disk member and a lower bolt adapted to extend through a center bore below said center polygonal recess in said upper disk member for threading engagement with said nut element, said nut element being shaped in the form of a cap, whereby upon the fastening of said nut element onto said bolt, said upper and lower disk members together with the coil of said string will be tightly fixed and locked for rotation with said output axis, said cutting string extending through said guide port out of said rotary disk-like casing to form a cutting flail with an effective working length in said cutting plane during rotation, said chamber defined by said upper and lower disk members being smaller than the thickness of said cutting string, each coil of said cutting string being connected with the adjacent coils thereof so that when the free end is pulled out the outermost coil can be stripped therefrom without disjoining the entire coil.

2. The mowing apparatus according to claim 1, wherein both the head of said bolt element and the recess in said upper disk member have a hexagonal configuration.

3. The mowing apparatus according to claim 1, wherein a plurality of flat coils are concentrically disposed in the chamber of said rotary casing, each cutting flail of each of said coils extending through respective guide ports outwardly from said casing, said guide ports being disposed equidistantly along the periphery of the casing.

* * * * *